United States Patent
Lillestolen et al.

(10) Patent No.: US 11,783,235 B2
(45) Date of Patent: Oct. 10, 2023

(54) REAL TIME OUTPUT CONTROL IN HARDWARE BASED ON MACHINE LEARNING

(71) Applicant: Hamilton Sundstrand Corporation, Charlotte, NC (US)

(72) Inventors: Kirk A. Lillestolen, East Hartland, CT (US); Kanwalpreet Reen, Ellington, CT (US); Richard A. Poisson, Avon, CT (US); Joshua Robert Dunning, Centreville, VA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 627 days.

(21) Appl. No.: 16/715,964

(22) Filed: Dec. 16, 2019

(65) Prior Publication Data
US 2021/0182737 A1   Jun. 17, 2021

(51) Int. Cl.
| | |
|---|---|
| *G06N 20/10* | (2019.01) |
| *G05B 17/02* | (2006.01) |
| *G06N 3/045* | (2023.01) |
| *G06N 7/01* | (2023.01) |
| G06N 3/044 | (2023.01) |

(52) U.S. Cl.
CPC ............. *G06N 20/10* (2019.01); *G05B 17/02* (2013.01); *G06N 7/01* (2023.01); *G05B 2219/24182* (2013.01); *G06N 3/044* (2023.01); *G06N 3/045* (2023.01)

(58) Field of Classification Search
CPC ...... G06N 20/10; G06N 7/005; G06N 3/0445; G06N 3/0454; G06N 20/20; G05B 17/02; G05B 2219/24182; G05B 19/0428
See application file for complete search history.

(56) References Cited

U.S. PATENT DOCUMENTS 10,176,320 B1   1/2019   McMurdie et al.
10,375,106 B1   8/2019   Roesler et al.
(Continued)

OTHER PUBLICATIONS

Gomperts, A., et al. "Development and Implementation of Parameterized FPGA-Based General Purpose Neural Networks for Online Applications" IEEE Transactions on Industrial Informatics, vol. 1, No. 1, pp. 78-89 (2011) (Year: 2011).*

(Continued)

*Primary Examiner* — Jay Hann
(74) *Attorney, Agent, or Firm* — Kinney & Lange, P.A.

(57) ABSTRACT

A machine learning system that includes one or more machine learning models implemented in one or more hardware processors, a first-level feature creation module, and a combination module provides an output based on one or more channel inputs. Each of the one or more machine learning models receives the channel inputs and additional feature inputs based on the channel inputs to produce the output. The first-level feature creation module receives the channel inputs, performs a feature creation operation, creates the additional feature inputs, and provides the additional feature inputs to at least one of the machine learning models. The first-level feature creation operation performs a calculation on one or more aspects of the channel inputs, and the combination module receives the one or more machine learning model outputs and produce a machine learning channel output.

15 Claims, 6 Drawing Sheets

(56) References Cited

U.S. PATENT DOCUMENTS

| | | | |
|---|---|---|---|
| 10,419,468 | B2 | 9/2019 | Glatfelter et al. |
| 10,938,592 | B2* | 3/2021 | Carroll .................. G06N 20/10 |
| 2020/0090056 | A1* | 3/2020 | Singhal .................. G06N 5/04 |
| 2020/0134429 | A1* | 4/2020 | Parker .................. G06N 3/0472 |
| 2020/0293940 | A1* | 9/2020 | Chopra .................. G06N 20/20 |
| 2020/0317365 | A1* | 10/2020 | Sherry .................. G06N 20/10 |
| 2020/0387834 | A1* | 12/2020 | Hackett .................. G06N 20/20 |
| 2021/0118024 | A1* | 4/2021 | Sollami .................. G06F 17/18 |
| 2021/0181694 | A1* | 6/2021 | Lillestolen .............. G06N 20/20 |

OTHER PUBLICATIONS

Garcia, A.N., et al. "Multilayer Perceptron Network with Integrated Training Algorithm in FPGA" IEEE 11th Int'l Conf. on Electrical Engineering, Computer Science & Automatic Control CCE (2014) (Year: 2014).*

Sousa, M. & Del-Moral-Hernandez, E. "An FPGA Distributed Implementation Model for Embedded SOM with On-Line Learning" IEEE Int'l Joint Conf. on Neural Networks (2017) available from <https://ieeexplore.ieee.org/document/7966351> (Year: 2017).*

Huang, C., et al. "A Layer-based Structured Design of CNN on FPGA" IEEE 12th Int'l Conf. on ASIC (2017) available from <https://ieeexplore.ieee.org/abstract/document/8252656> (Year: 2017).*

Heelan, C., et al. "FPGA implementation of deep-learning recurrent neural networks with sub-millisecond real-time latency for BCI-decoding of large-scale neural sensors (104 nodes)" IEEE 40th Int'l Conf. on IEEE Engineering in Medicine & Biology Society (2018) available from <https://ieeexplore.ieee.org/abstract/document/8512415> (Year: 2018).*

Khalil, K., et al. "A Novel Reconfigurable Hardware Architecture of Neural Network" IEEE 62nd Int'l Midwest Symp. on Circuits & Systems (Oct. 2019) available from <https://ieeexplore.ieee.org/document/8884809> (Year: 2019).*

Chen, Y., et al. "T-DLA: An Open-source Deep Learning Accelerator for Ternarized DNN Models on Embedded FPGA" IEEE Computer Society Annual Symposium on VLSI (Jul. 2019) available from <https://ieeexplore.ieee.org/abstract/document/8839554> (Year: 2019).*

Mendes-Moreira, J., et al. "Ensemble Approaches for Regression: A Survey" ACM Computing Surveys, vol. 45, No. 1, article 10 (2012) (Year: 2012).*

A. Hassan, M. Shariff Nabi Baksh, A. M. Shaharoun, and J. Jamaluddin, Improved SPC Chart Pattern Recognition Using Statistical Features, Taylor & Francis Group, 2003, pp. 1587-1603, vol. 41, No. 7, 17 pages.

Jianbo Yu, Lifeng Xi, Xiaojun Zhou, Identifying source(s) of out-of-control signals in multivariate manufacturing processes using selective neural network ensemble, Engineering Applications of Artificial Intelligence, Feb. 1, 2009, pp. 141-152, vol. 22, No. 1, 12 pages.

Le Zhang and Ponnuthurai Nagaratnam Suganthan, Visual Tracking With Convolutional Random Vector Functional Link Network, IEEE Transactions on Cybernetics, Oct. 2017, pp. 3243-3253, vol. 47, No. 10, 11 pages.

Yushi Chen, Ying Wang, Yanfeng Gu, Xin He, Pedram Ghamisi, and Xiuping Jia, Deep Learning Ensemble for Hyperspectral Image Classification, IEEE Journal of Selected Topics in Applied Earth Observations and Remote Sensing, Jun. 6, 2019, pp. 1882-1897, vol. 12, No. 6, 16 pages.

Extended European Search Report dated May 10, 2021, received for corresponding European Application No. 20206621.3, 11 pages.

Deep Learning, Wikipedia, 26 pages.

\* cited by examiner

Multi-Layer Perception (MLP)

REAL TIME OUTPUT CONTROL IN HARDWARE BASED ON MACHINE LEARNING

CROSS-REFERENCE TO RELATED APPLICATION

Reference is hereby made to U.S. patent application Ser. No. 16/715,948, entitled "REAL TIME OUTPUT CONTROL BASED ON MACHINE LEARNING HARDWARE IMPLEMENTATION", which was filed on the same date as this application.

BACKGROUND

The present application relates to electronic controllers, and more particularly, to a fault-tolerant controller architecture that employs a machine learning model.

In critical systems, redundancy is implemented to allow a system to continue to function in the event of a failure in one or more of the redundant systems. A flight-critical system in an aircraft is a non-limiting example of a critical system, whereby approaches used in the prior art have been to add system redundancy. Although redundancy can provide some level of failure mitigation in the event of random failures of a redundant component, some level of vulnerability can exist to other threats. For example, a common-mode failure that can affect redundant components in a similar manner, thereby introducing an unanticipated system-level failure. Moreover, utilizing redundant independent controllers can scale the cost of a system by the number of independent controllers. Therefore, merely duplicating components to provide additional redundancy is not preferred in some embodiments. Because modern control systems can employ software components for carrying out a control function, these systems can be susceptible to software vulnerability, cyber threats, and the like. While modern software systems are generally vigilant to cyber threats, an unknown or unaddressed vulnerability (i.e., a zero-day vulnerability) can make a redundant system vulnerable to a failure. Therefore, it can be helpful to have a non-software controller implementation in some embodiments, which can overcome some of the aforementioned shortcomings of a redundant software-based controller system. Some control systems utilize a signal processing technique that provides an output that is based on previous temporal calculations, for example, a finite impulse response (FIR) filter. While being useful from a perspective of providing a refined output, this can result in an intolerable response delay in some applications. Therefore, it can be helpful to have a no-delay filter that can be adapted to a particular application to provide an improved response.

SUMMARY

A machine learning system is configured to provide an output based on one or more channel inputs. The machine learning system includes one or more machine learning models implemented in one or more hardware processors, a first-level feature creation module, and a combination module. Each of the one or more machine learning models is configured to receive the one or more channel inputs and additional feature inputs based on the one or more channel inputs and to produce a machine learning model output. The first-level feature creation module is configured to receive the one or more channel inputs, perform a feature creation operation on the one or more channel inputs, create the additional feature inputs, and provide the additional feature inputs to at least one of the one or more machine learning models, whereby the first-level feature creation operation performs a calculation on one or more aspects of the one or more channel inputs. The combination module is configured to receive the one or more machine learning model outputs and produce a machine learning channel output.

A method of using a machine learning system to provide an output based on one or more channel inputs is disclosed. The machine learning channel includes one or more machine learning models each implemented in one or more hardware processors, a first-level feature creation module, and a combination module. The method includes receiving one or more channel inputs by a first-level feature creation module, performing, a feature creation operation on the one or more channel inputs by the first-level feature creation module, whereby the first-level feature creation operation provides a calculation of one or more aspects of the one or more channel inputs, calculating an additional feature outputs by the first-level feature creation module, providing the additional feature outputs to at least one of the one or machine learning models from the first-level feature creation module, receiving the one or more channel inputs and the additional feature outputs by each of the one or more machine learning models, receiving the one or more machine learning model outputs by the combination module, and producing a machine learning channel output by the combination module.

DETAILED DESCRIPTION

A system that uses one or more hardware-based machine learning models (MLMs) is disclosed, thereby providing a system that is not reliant on software-based processing. The hardware-based machine learning system can be used as a complete solution, as a redundant dissimilar channel within a system, or as a backup to a traditional software-based control system, as will be shown and described herein.

Figure 1:
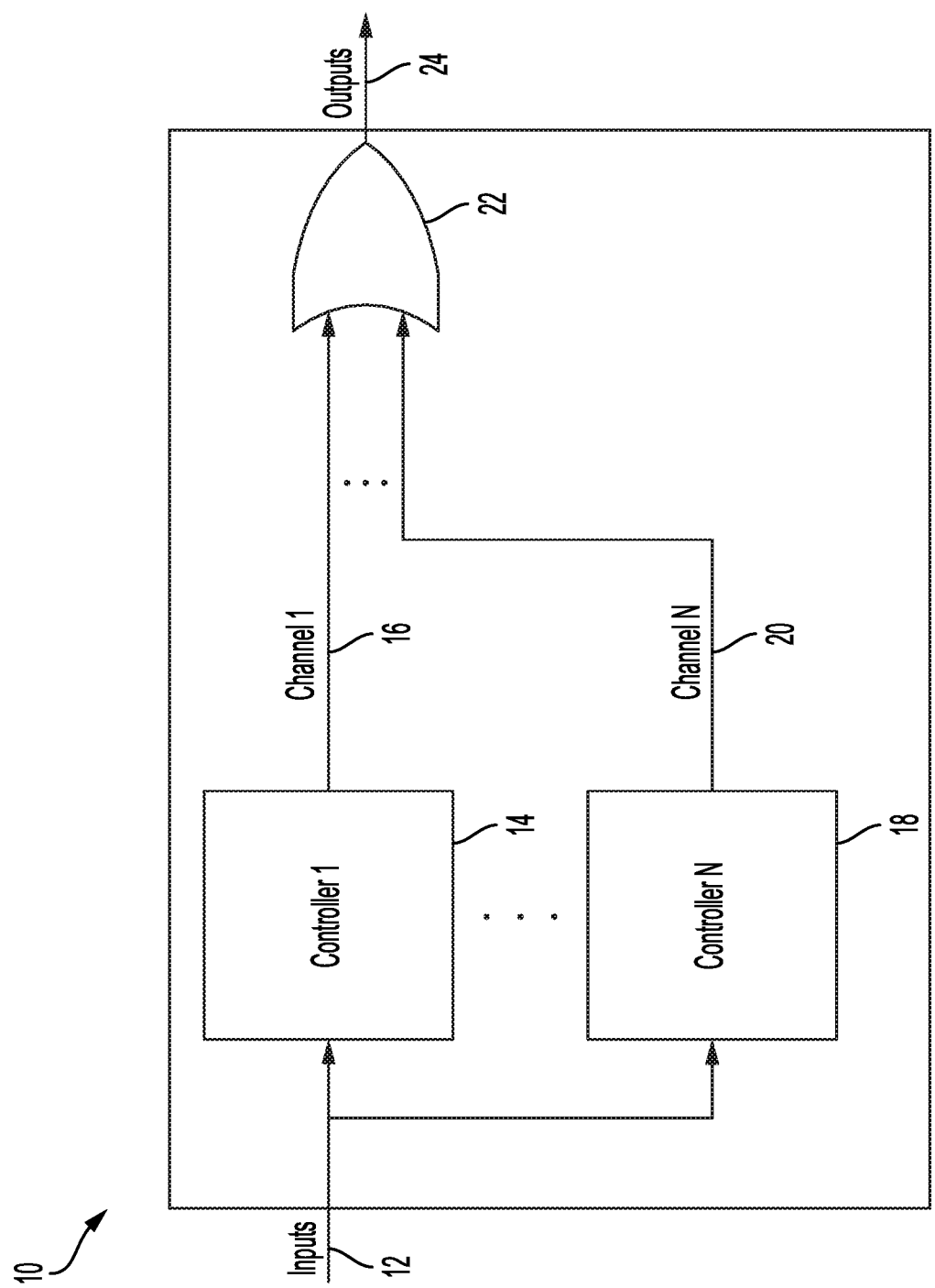
FIG. 1 is a schematic block diagram of a control system with redundant controllers.

FIG. 1 is a schematic block diagram of a control system with redundant controllers. Shown in FIG. 1 are redundant system 10, controller inputs 12, first controller 14, first channel outputs 16, Nth controller 18, Nth channel outputs 20, combination logic 22, and system outputs 24. Redundant system 10 can be referred to as a controller, because it can be used to perform the function of a stand-alone controller while adding the robustness of multiple (i.e., two or more) controller channels. Redundant system 10 includes a number N of individual controllers (i.e., first controller 14, . . . , Nth controller 18) as shown in FIG. 1. In the illustrated embodiment, two controller channels are used. In another exemplary embodiment, three controller channels can be used. The output of each controller (i.e., first channel output 16, . . . , Nth channel output 20) are input to combination logic 22, which utilizes the output of one or more channels to produce system output 24. Combination logic 22 can utilize a variety of logic functions, depending on the purpose of redundant system 10. For example, if redundant system 10 initiates a critical protective response, combination logic 22 can be an OR logic gate. It is to be appreciated that combination logic 22 is depicted as an OR logic gate in FIG. 1, however any combination logic can be used in various embodiments. As another example, if redundant system 10 initiates a critical protective response, but if an unintentional protective response is undesirable, then combination logic 22 can perform coincidence logic requiring two or more controller channels to signal a response. In this example, proper operation of redundant system 10 will exist if one of the three channels either fails in a response condition, or fails to produce a response condition. As another example, if redundant system 10 provides a linear response (e.g., movement of an actuator in response to a linear input), then combination logic 22 can perform an averaging function. In this particular example, greater reliability can be achieved by having a greater number of channels (e.g., three channels as compared to two). However, adding a greater number of channels can result in a corresponding increase in system complexity, cost, space, power requirements, cooling requirements, and the like. Moreover, merely adding a greater number of channels can result in decreased system reliability in some embodiments. It is to be appreciated that the foregoing examples are non-limiting, and are a few of a limitless number of possible embodiments for redundant system 10.

The architecture of redundant system 10 shown in FIG. 1 can be utilized for a system employing N redundant channels of the prior art utilizing software-based control systems. Accordingly, in a particular embodiment, first controller 14, . . . , Nth controller 18 can be similar or dissimilar software-based controllers which can be used to improve the reliability and robustness of a control system, yet which can be vulnerable to software-based threats (i.e., cyber threats). In other embodiments, the architecture of redundant system 10 shown in FIG. 1 can be utilized for a system employing N redundant channels of hardware-based MLM controllers, which can overcome the vulnerabilities of a software-based system. In yet other embodiments, the architecture of redundant system 10 shown in FIG. 1 can be utilized for a system employing N redundant channels which are a combination of both software-based controllers and hardware-based MLM controllers. Various embodiments of a system employing hardware-based MLMs will be shown and described in FIGS. 2-6, below.

Figure 2:
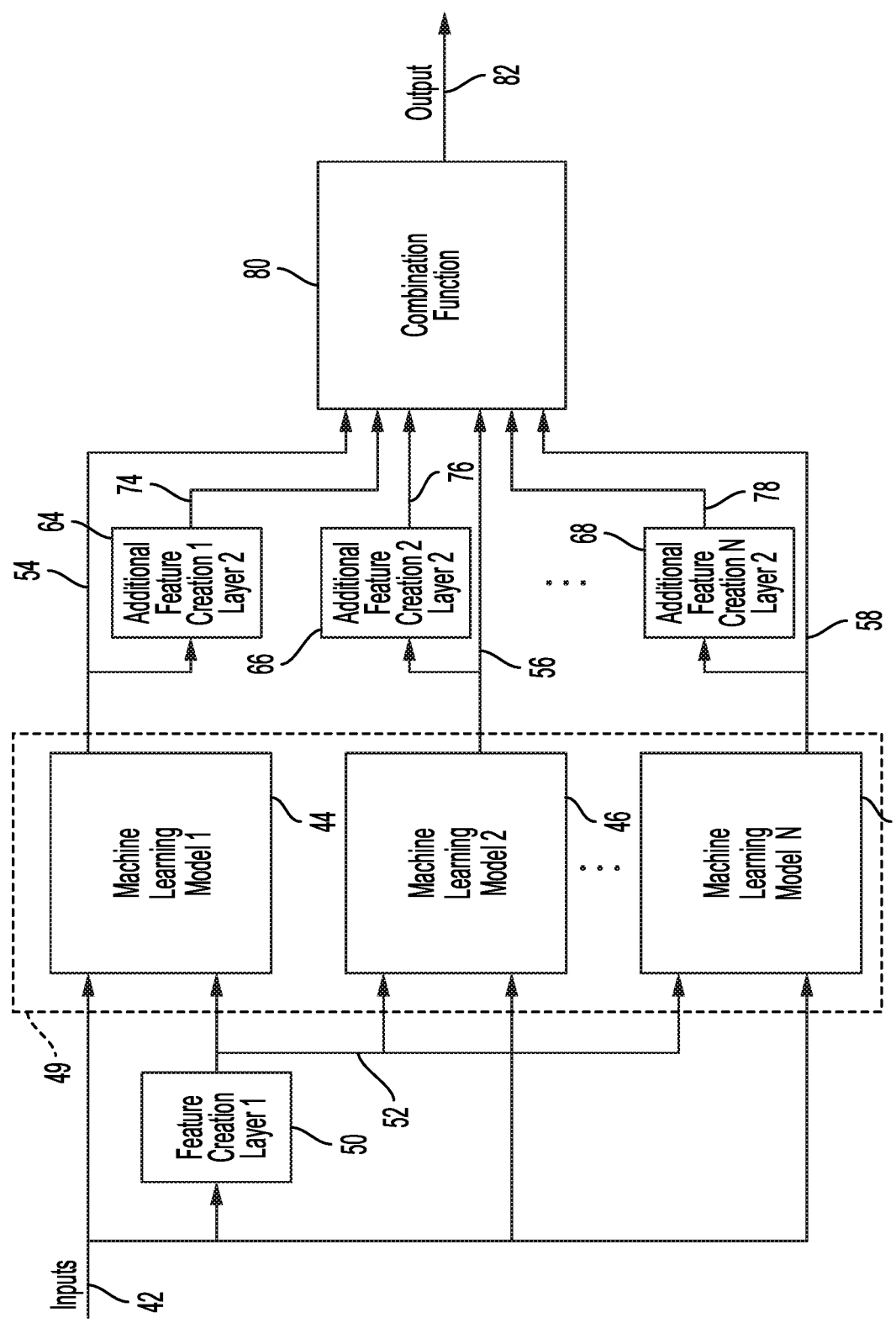
FIG. 2 is a schematic block diagram of a machine learning model-based channel.

FIG. 2 is a schematic block diagram of a machine learning model (MLM)-based channel. Shown in FIG. 2 are machine learning channel 40, inputs 42, first MLM 44, second MLM 46, Nth MLM 48, processor 49, first layer feature creation operation 50, first layer feature creation output 52, first MLM output 54, second MLM output 56, Nth MLM output 58, second layer feature creation operations 64, 66, 68, second layer feature creation operation outputs 74, 76, 78, combination module 80, and output 82. Machine learning channel 40 can represent one channel of one or more outputs that are provided by a controller (i.e., output controller). In an exemplary embodiment, machine learning channel 40 depicts one machine learning model (MLM)-based channel within first controller 14, . . . , Nth controller 18 shown above in FIG. 1. Accordingly, by instantiating multiple copies of machine learning channel 40, a controller having multiple outputs can be created. Machine learning channel 40 receives inputs 42, which can represent one or more particular parameters, and provides output 82. Output 82 can be referred to as an output function. Accordingly, machine learning channel 40 can be configured to implement a unique function in response to inputs 42 (i.e., one or more particular parameters). In various embodiments, these unique functions can include response functions, protective functions, the generation of messages for other systems, control functions, and so on. In performing a control function, machine learning channel 40 can function as an open loop system, a feedback control system, a feed forward control system, or any other control system. A non-limiting example of an aviation control system can pertain to the positioning of an actuator for a tail elevator for controlling the elevation of an aircraft. In this exemplary embodiment, machine learning channel 40 can receive as inputs the desired position of the tail elevator and the sensed position of the tail elevator, which can generate outputs that can be used to control an actuator that positions a tail elevator of an aircraft.

Referring again to FIG. 2, first MLM 44, second MLM 46, and Nth MLM 48 are implemented in processor 49, which represents one or more hardware components. Inputs 42 are provided to first MLM 44, second MLM 46, and Nth MLM 48, whereby machine learning channel 40 includes any integer number N of separate MLMs. First, second, and third MLMs 44, 46, 48 can be referred to as MLM channels when describing a signal flow path through machine learning channel 40. Therefore, machine learning channel 40 can be said to have N machine learning sub-channels (i.e., MLM sub-channels). It is to be appreciated that machine learning channel 40 is not a redundant channel controller in the traditional sense of controller redundancy. Instead, machine learning channel 40 is an embodiment of multiple neural networks (i.e., MLMs) that together comprise machine learning channel 40. Inputs 42 are also provided to first layer feature creation operation 50, which in turn provides first layer feature creation output 52 to each of first MLM 44, second MLM 46, and Nth MLM 48. First layer feature creation operation 50 is so named because the input layer to machine learning channel 40 can be referred to as the first layer. First layer feature creation operation 50 calculates one or more signals derived from inputs 42, which can enhance the accuracy of various machine learning algorithms used by first MLM 44, second MLM 46, and Nth MLM 48. Non-limiting examples of the one or more signals derived from input 42 include input slew rates, derivatives, averages, integrals, differences (i.e., deltas), filtered inputs, and transfer function calculations. Averages can include weighted averages, n-sample averages, rolling averages, and so on. An exemplary average-calculating operation provides a rolling average calculation. Difference inputs can include amplitude differences, phase differences, and so on. Filtered inputs can involve low-pass filters, high-pass filters, band-pass filters, band-stop filters, and any combinations of these. Integration can be represented as $(1/S)$. A low-pass filter can be represented as $(1/(S+1))$, and a high-pass filter can be represented as $(S/(S+1))$. A derivative can be represented as $(sF(s)-f(0))$. In some embodiments, integration, filters, and derivatives as feature creation operation 50 can assist MLMs 44, 46, 48 in learning difficult output equations, while not relating to the functionality of machine learning channel 40. In some embodiments, deltas, averages, and rates (e.g., input slew rates, derivatives) as feature creation operation 50 can assist MLMs 44, 46, 48 in understanding changes over time, and/or in providing noise elimination. First layer feature creation operation 50 can produce first layer feature creation output 52 using analog and/or digital circuits.

First MLM 44, second MLM 46, and Nth MLM 48 (collectively, the MLMs) can each be any known or future-developed MLM, with non-limiting examples including support vector regression (SVR), linear regression, multi-layer perceptron (MLP), recursive neural network (RNN), convolutional neural network (CNN), continuous time neural network (CTNN), Elman network, long short-term memory (LSTM), polynomial regression, echo state network, recurrent multilayer perceptron network (RMLP), Hopfield network, and Bayesian linear regression. Persons who are skilled in the MLM art are knowledgeable of various MLMs and the associated MLM training operations. Accordingly, all MLMs are within the scope of the present disclosure. In an exemplary embodiment, the MLMs are each a different MLM, each having an associated MLM training operation. A MLM training operation can utilize one or more different possible MLM training modes. The coefficients used in MLM are determined during the training operation (i.e., learning phase). Accordingly, in another exemplary embodiment, two or more of the MLMs can employ the same ML algorithm, with each having a different ML training set to create unique MLMs. The architecture shown in FIG. 2 includes N MLMs, with N representing an integer of three or more. In some embodiments, machine learning channel 40 can include fewer than three MLMs. In an exemplary embodiment, machine learning channel 40 can include a single MLM. Exemplary embodiments of machine learning channel 40 will be shown and described below, in FIGS. 3-6.

Referring again to FIG. 2, first MLM 44 provides first MLM output 54, second MLM 46 provides second MLM output 56, and Nth MLM 48 provides Nth MLM output 58 (collectively, the MLM outputs). Each of the MLM outputs 54, 56, 58 is provided to combination module 80. Each of the MLM outputs 54, 56, 58 is also provided to an associated second layer feature creation operation 64, 66, 68, the descriptions of which are substantially similar to that provided above in regard to first layer feature creation operation 50. Each second layer feature creation operation 64, 66, 68 provides an associated second layer feature creation operation output 74, 76, 78. Accordingly, combination module 80 receives MLM outputs 54, 56, 58 and second layer feature creation operation outputs 74, 76, 78, and can utilize a combination function to provide output 82. Combination module 80 calculates (i.e., determines) the final predicted output value of machine learning channel 40 based on the MLM outputs 54, 56, 58. In the illustrated embodiment, combination module 80 is a MLM that received and weighs MLM outputs 54, 56, 58 and second layer feature creation operation outputs 74, 76, 78 to calculate (i.e., determine) output 82. In the illustrated embodiment whereby combination module 80 is a MLM, the performance (i.e., trained performance) of combination module 80 can be improved. An exemplary MLM embodiment for combination module will be described later, in FIG. 3. In some embodiments, combination module 80 can employ a logic function that can be similar to that of combination logic 22, as described above in regard to FIG. 1. A particular advantage of machine learning channel 40 is the ability to implement MLMs 44, 46, 48 and combination module 80 in hardware, as opposed to requiring a software-based system that runs in a central processing unit (CPU). Any hardware-based architecture can be used to implement MLMs 44, 46, 48, with non-limiting examples including one or more field-programmable gate arrays (FPGA), one or more application-specific integrated circuits (ASICs), and any combination of the above.

Referring again to FIG. 2, machine learning channel 40 is highly adaptable, and can be trained (i.e., during the learning phase) to perform practically any operation that can be performed by a controller. Therefore, machine learning channel 40 can employ an algorithm that eliminates spikes and noise that is inherent in some MLMs and/or is inherent in the inputs of some MLMs, without adding any processing delay (i.e., latency) or other attenuation. Non-limiting examples of sources of electronic interference on inputs include electromagnetic interference (EMI), radio frequency interference (RFI), static discharge, lightning, and induced voltages from electromagnetic transmissions. Accordingly, machine learning channel 40 can be utilized as a no-latency filter. In an exemplary embodiment, machine learning channel 40 can utilize one MLM (i.e., N=1) to provide a no-latency filter that can be adaptable to any embodiment. Machine learning channel 40 can also be referred to as a machine learning system, while not necessarily implying that the machine learning system is a top level system. In various embodiments, machine learning channel 40 (i.e., machine learning system) can be a sub-system in any other system. Machine learning channel 40 can be referred to as real-time output control because no latency is introduced in its operation.

In the illustrated embodiment, first MLM 44, second MLM 46, and Nth MLM 48 are implemented in processor 49 being a single processor. In some embodiments, first layer feature creation operation 50 can be implemented digitally, in hardware. In some of these embodiments, first layer feature creation operation 50 can be implemented in processor 49 along with first MLM 44, second MLM 46, and Nth MLM 48. In other of these embodiments, first layer feature creation operation 50 can be implemented in a separate processor. In some embodiments, second layer feature creation operations 64, 66, 68 can be implemented digitally, in hardware. In some of these embodiments, second layer feature creation operations 64, 66, 68 can be implemented in processor 49 along with first MLM 44, second MLM 46, and Nth MLM 48. In other of these embodiments, second layer feature creation operations 64, 66, 68 can be implemented in a separate processor. In some embodiments, combination module 80 can be implemented in processor 49 along with first MLM 44, second MLM 46, and Nth MLM 48. In any of the aforementioned embodiments, any of first MLM 44, second MLM 46, Nth MLM 48, first layer feature creation operation 50, second layer feature creation operations 64, 66, 68, and combination module 80 can be implemented in more than one processor. Accordingly, in some embodiments, machine learning channel 40 can be implemented in one or more processors.

Figure 3:
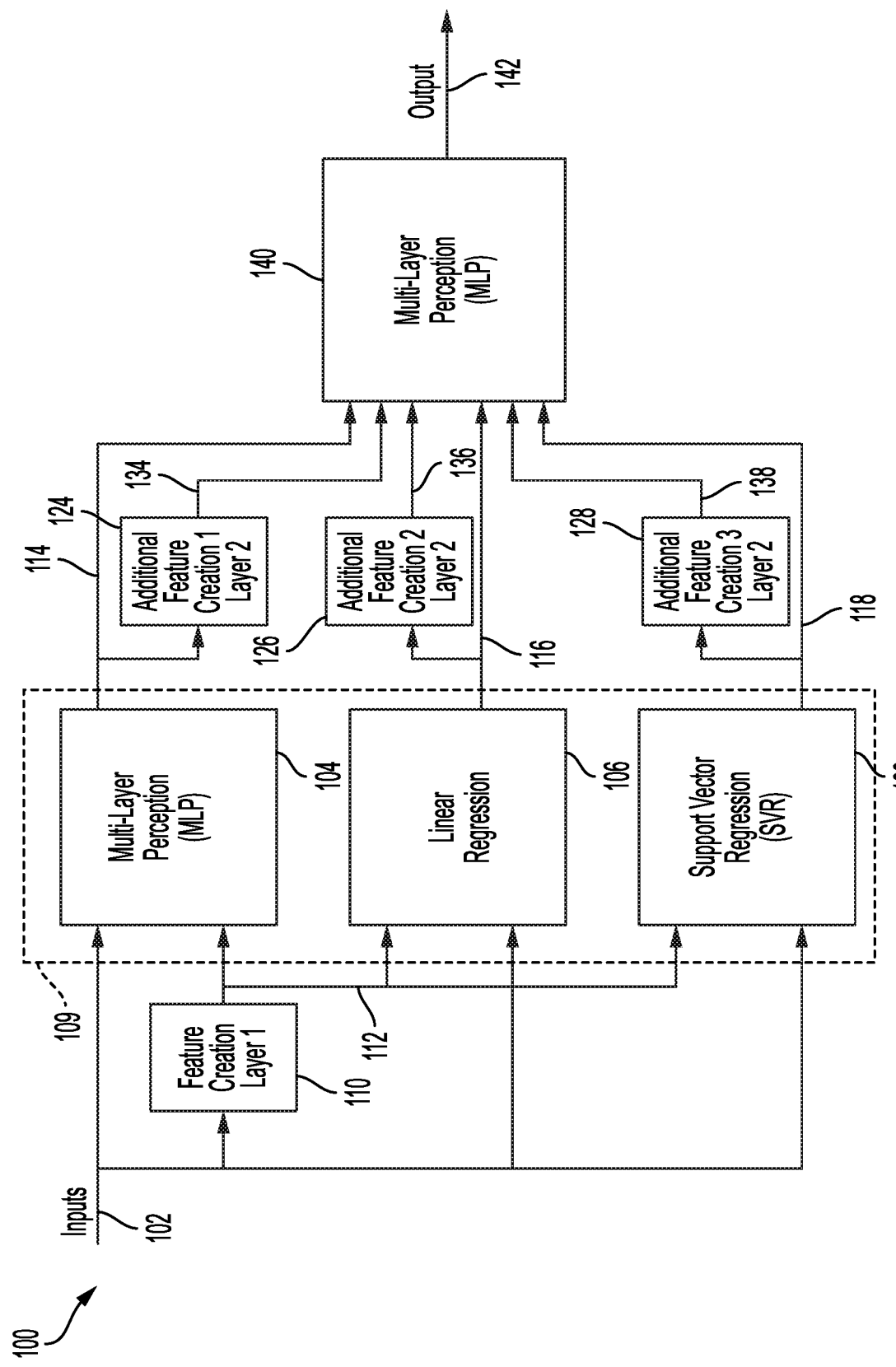
FIG. 3 is a schematic block diagram of an exemplary implementation of the machine learning model-based channel shown in FIG. 2.

FIG. 3 is a schematic block diagram of an exemplary implementation of machine learning channel 40 shown in FIG. 2. Shown in FIG. 3 are machine learning channel 100, input 102, multi-layer perceptron (MLP) MLM 104, linear regression MLM 106, support vector regression (SVR) MLM 108, processor 109, first layer feature creation operation 110, first layer feature creation output 112, MLP MLM output 114, linear regression MLM output 116, SVR MLM output 118, second layer feature creation operations 124, 126, 128, second layer feature creation operation outputs 134, 136, 138, MLP MLM combination module 140, and output 142. Architecturally, machine learning channel 100 is similar to machine learning channel 40 shown and described above in regard to FIG. 2, however machine learning channel 100 discloses a particular embodiment that can be implemented in hardware. In the illustrated embodiment, machine learning channel 100 utilizes three machine learning channels, each being different from the others, as follows. MLP MLM 104 (i.e., the first channel) is a neural network MLP MLM, and is known to those who are skilled in the MLM art. An exemplary MLP MLM will be shown later, in FIG. 4. MLP MLM 104 can be readily implemented in hardware, while providing a relatively accurate replication of all output types that can be used in a system. Output types can generally be categorized as being discrete, continuous, and impulse functions. However, the accuracy of MLP MLM 104 can be reduced under some conditions, for example, with complex or high-order outputs. Also, under some conditions, MLP MLM 104 can be susceptible to spike transients from input transitions, and/or can create their own impulse response (e.g., self-induced spikes).

Referring again to FIG. 3, linear regression MLM 106 (i.e., the second channel) is a relatively straight-forward MLM that is known to those who are skilled in the MLM art and which can be readily implemented in hardware. A linear regression model, for example, can be modeled as shown in equation 1, where Y is the output value, b0, b1, b2, . . . , bK are model coefficients, and x1, x2, . . . , xK are input values.

$$Y = b0 + b1 \times 1 + b2 \times 2 + \ldots + bK \times K \quad \text{Equation 1:}$$

The coefficients used in linear regression MLM 106 are determined during the learning phase. Thereafter, these coefficients are stored in a memory location. Linear regression MLM 106 can be used for recognizing signal transitions, discrete steps, and relatively simple linear signal behavior. However, the accuracy of linear regression MLM 106 can be reduced under some conditions, for example, with digital, complex, and/or higher-order outputs.

SVR MLM 108 (i.e., the third channel) is a neural network SVR MLM that is known to those who are skilled in the MLM art and which can be implemented in hardware. An exemplary support vector recognition MLM will be shown later, in FIG. 5. While being implementable in hardware, the hardware resources required can be more extensive than either MLP MLM 104 or linear regression MLM 106. SVR MLM 108 is generally well-suited for complex functions, and/or with higher-order continuous waveforms.

Referring again to FIG. 3, MLP MLM 104, linear regression MLM 106, and SVR MLM 108 are implemented in processor 109. MLP MLM 104, linear regression MLM 106, and SVR MLM 108 each have an associated second layer feature creation operation 124, 126, 128, which in turn provides an associated second layer feature creation operation output 134, 136, 138. The descriptions of first layer feature creation operation 110, first layer feature creation output 112, second layer feature creation operations 124, 126, 128, and second layer feature creation operation outputs 134, 136, 138 are substantially similar to those provided above in regard to FIG. 2. MLP MLM combination module 140 receives MLP MLM output 114, linear regression MLM output 116, SVR MLM output 118, and second layer feature creation operation outputs 134, 136, 138. The description of MLP MLM combination module 140 is similar to that provided above for combination module 80 in terms of purpose, while using a MLP MLM because the MLP MLM can be particularly well-adapted for receiving inputs from three different MLMs (i.e., machine learning channels). Machine learning channel 100 can be described as a hardware-based system for providing real-time output control.

Referring again to FIG. 3, the combination of additional feature creation (N=1 to 3) layer 2 (124, 126, 128) implementing a rolling average as a non-limiting example, and MLP MLM 140 can be used to provide a no-latency filter that can be adaptable to any embodiment, thereby providing a versatile, configurable, and reusable hardware-based no-latency filter. This implementation can overcome the disadvantages of systems utilizing a signal processing technique that provides an output that is based on previous temporal calculations (e.g., a finite impulse response (FIR) filter). By eliminating latency, a hardware-based no-latency filter can be advantageous in a control system that processes rapidly-changing inputs but afford the delay associated with traditional methods of eliminating noise content, for example. A non-limiting example of an application where a hardware-based no-latency filter can be useful is in a flight-control system on an aircraft. In classic control systems, latency is equivalent to phase delay. Phase delay has the effect of eroding the robustness of a control system by reducing the phase margin. The loss of all phase margin usually results in a badly behaving system either in slow response or by instability. The filter is desired to eliminate unwanted frequency content from affecting the control. Currently a balance has to be struck between the robustness and the performance. The zero-latency filter allows the control to eliminate the unwanted frequency content while maintaining the robustness of the control system.

In the illustrated embodiment, MLP MLM 104, linear regression MLM 106, and SVR MLM 108 are implemented in processor 109. In some embodiments, MLP MLM combination module 140 can also be implemented in processor 109. In other embodiments, first layer feature creation operation 110, second layer feature creation operations 124, 126, 128 can also be implemented in processor 109. In any of the aforementioned embodiments, any MLP MLM 104, linear regression MLM 106, and SVR MLM 108, first layer feature creation operation 110, second layer feature creation operations 124, 126, 128, and MLP MLM combination module 140 can be implemented in more than one processor. Accordingly, in some embodiments, machine learning channel 100 can be implemented in one or more processors.

Figure 4:
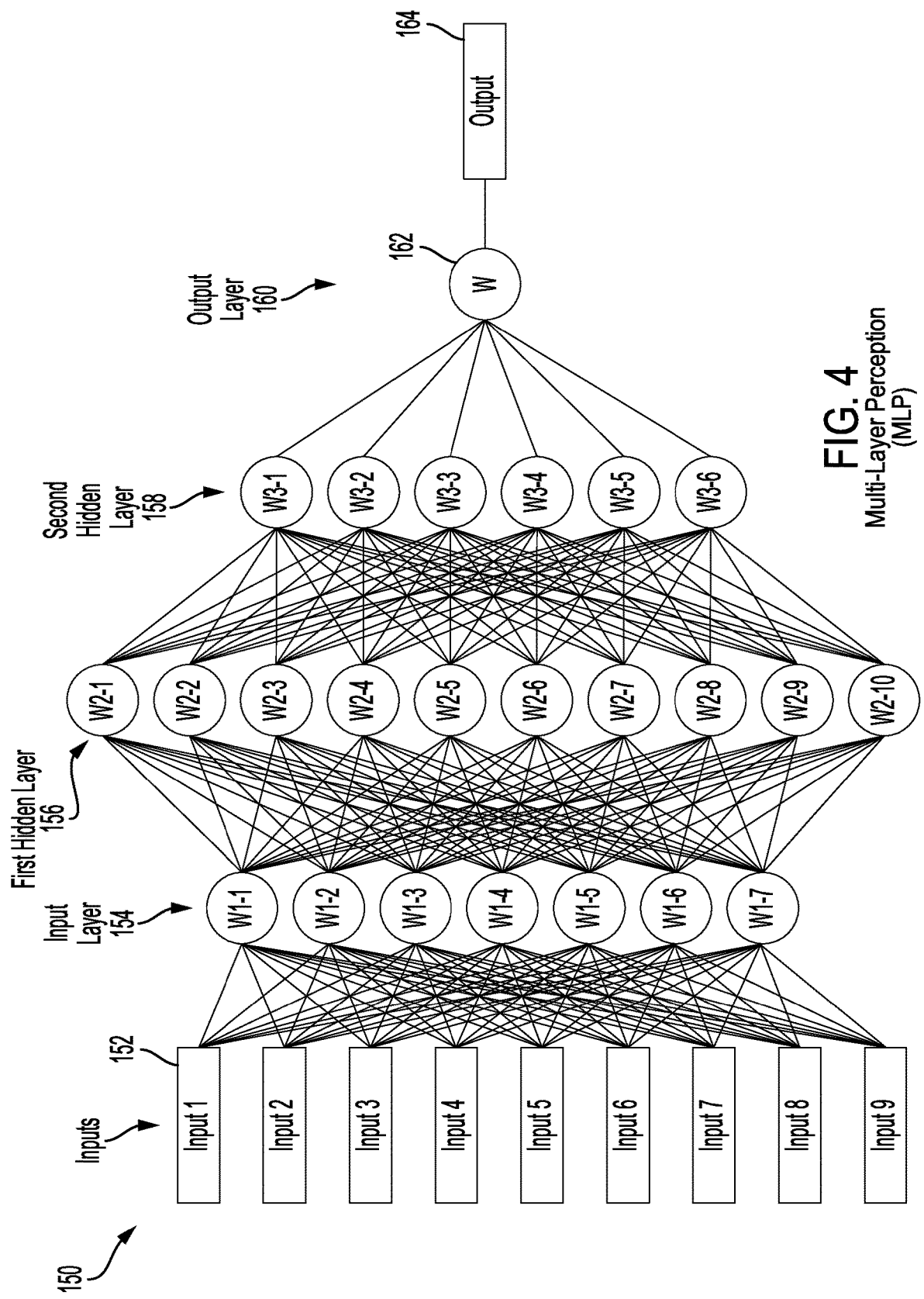
FIG. 4 is a schematic block diagram of an exemplary multi-layer perceptron machine learning model.

FIG. 4 is a schematic block diagram of an exemplary MLP MLM, which can be used to describe either of two instantiations of a MLP MLM (e.g., MLP MLM 104, MLP MLM combination module 140) shown above in FIG. 3. Shown in FIG. 4 are MLP MLM 150, inputs 152, input layer 154, first hidden layer 156, second hidden layer 158, output layer 160, output node 162, and output 164. In the illustrated embodiment, MLP MLM 150 receives nine inputs 152 which are labeled Input 1 through Input 9. Inputs 152 can be representative of sensed parameters and/or input conditions associated with a hardware system or component. Input layer 154 includes seven nodes which are labeled W1-1 through W1-7, with each node having a connection from each input 152. The nodes can be referred to as neurons, and the connections can be referred to as synapses. Each node W1-1 through W1-7 applies a weighting function to each received input, thereby providing an output that is provided to first hidden layer 156, and then to second hidden layer 158. First hidden layer includes ten nodes (i.e., neurons) which are labeled W2-1 through W2-10, and second hidden layer 158 includes six nodes (i.e., neurons) which are labeled W3-1 through W3-6. Nodes in first and second hidden layers 156, 158 receive inputs from the previous layer and apply a weighting function to each of the received inputs. The six outputs from second hidden layer 158 are provided to output layer 160, consisting of output node 162. In a similar manner to nodes in previous layers, output node 162 performs a weighting function, thereby providing output 164. The nodes (i.e., neurons) in MLP MLM 150 each have associated weighting and bias values that are determined during the learning phase. Thereafter, the weighting and bias values are stored in a hardware memory location. MLP MLM 150 is exemplary, and other embodiments can include different numbers of nodes in each of the various layers. Moreover, in some embodiments, any number of hidden layers can be used. In a particular embodiment, one or more hidden layers or nodes can be suppressed by adjusting the weighting and biasing coefficients. In some embodiments, no hidden layers are used. The functionality of MLP MLM 150 can be implemented entirely in hardware, with a non-limiting example being a field-programmable gate array (FPGA). Accordingly, in the illustrated embodiment, MLP MLM 150 receives signals corresponding to various parameters and/or conditions as inputs 152, which are processed by input layer 154, first and second hidden layers 156, 158, and output layer 160. In the illustrated embodiment, an exemplary MLM (e.g., MLP MLM 104, MLP MLM combination module 140) uses an activation function, which can be one of any activation functions that can be used with MLP machine learning. An exemplary activation function is sigmoid activation.

Figure 5:
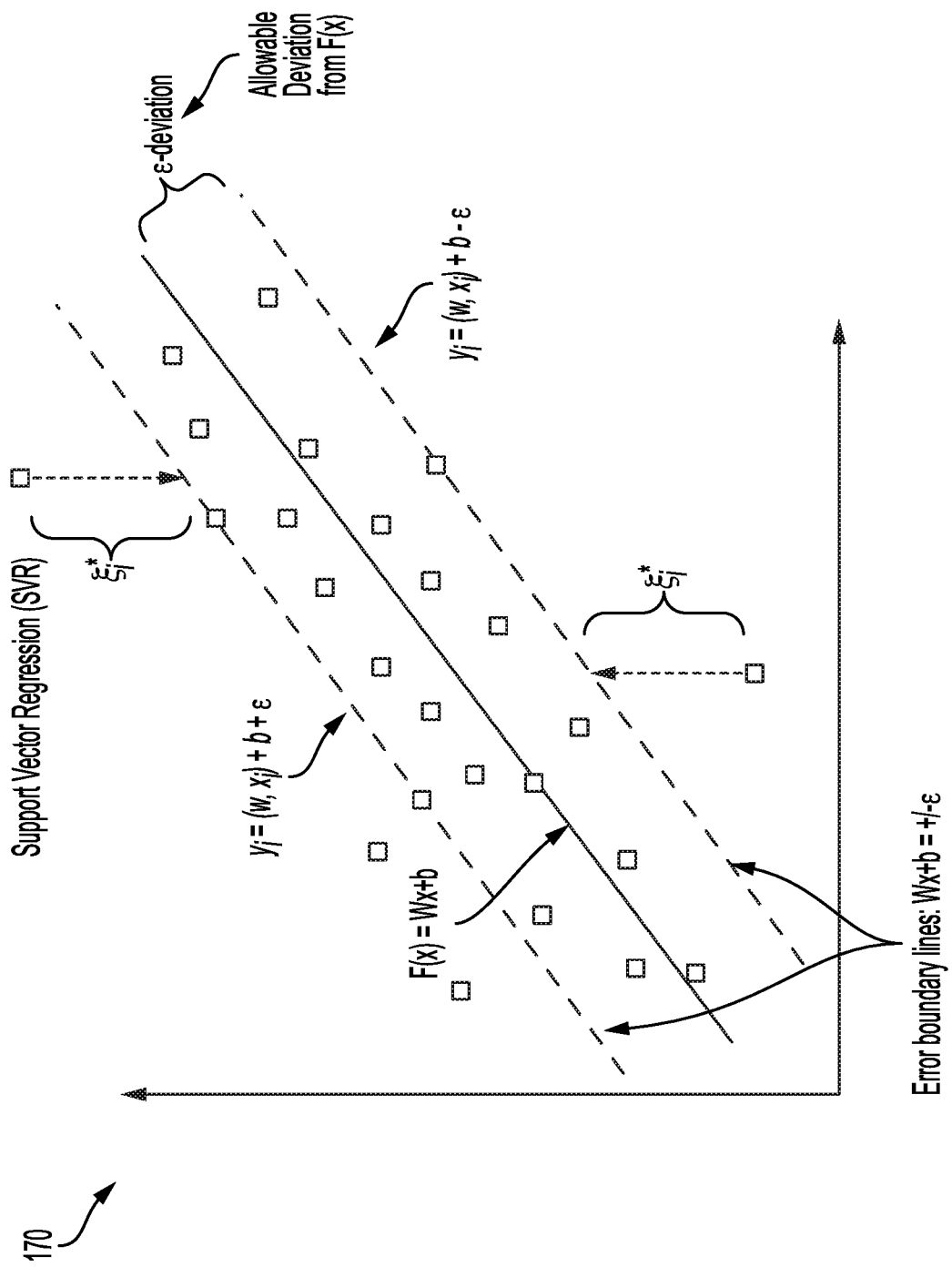
FIG. 5 is a graphical representation of a support vector regression machine learning model.

FIG. 5 is a graphical representation of a SVR MLM, showing SVR MLM 170 with associated labels and nomenclature. Those who are skilled in the MLM art are familiar with the representation used to depict SVR MLM 170. While requiring more hardware overhead than other MLMs, SVR MLM 170 can be implemented entirely in hardware, thereby overcoming the vulnerabilities that can affect a software-based system. The support vectors and coefficients used in SVR MLM 170 are determined during the learning phase. Thereafter, the support vectors and coefficients are stored in a hardware memory location.

Figure 6:
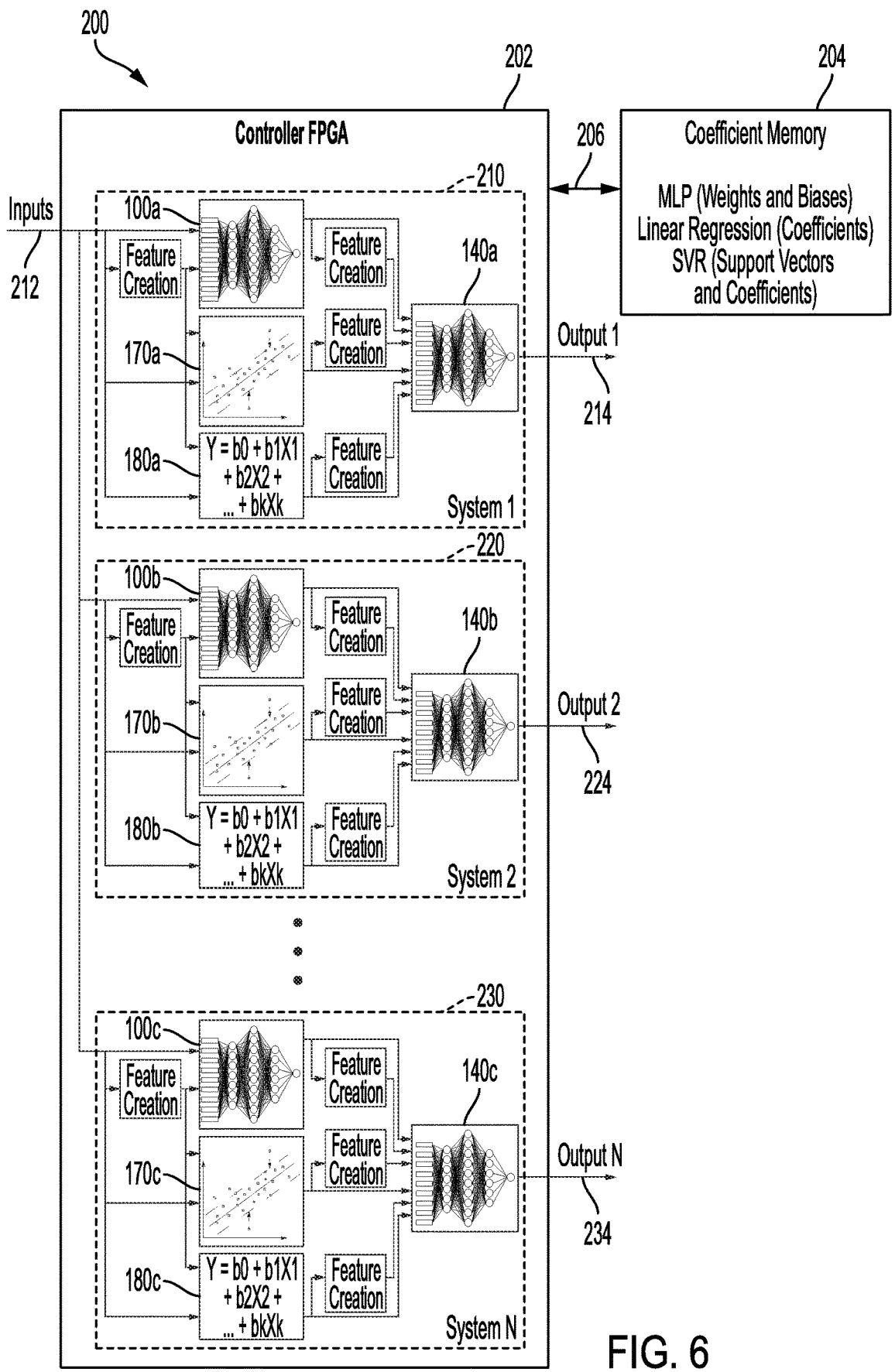
FIG. 6 is a schematic block diagram of an exemplary implementation of a machine learning model-based control system using a field-programmable gate array.

FIG. 6 is a schematic block diagram of an exemplary implementation of a MLM-based control system using a field-programmable gate array. Shown in FIG. 6 are field-programmable gate array (FPGA) implementation 200, controller field-programmable gate array (FPGA) 202, coefficient memory 204, data bus 206, first channel 210, channel inputs 212, first channel output 214, second channel 220, second channel output 224, Nth channel 230, and Nth channel output 234. FPGA implementation 200 depicts an exemplary embodiment of multiple (i.e., a number N) MLM-based control channel outputs that are implemented within a particular FPGA 202. In the illustrated embodiment, first channel 210, second channel 220, and Nth channel 230 are each a separate instantiation of an identical machine learning channel. Machine learning channel 100 shown and described above in regard to FIG. 3 is a non-limiting example of a machine learning channel that can be used for each of first channel 210, second channel 220, and Nth channel 230. FPGA implementation 200 can be used to provide MLM-based outputs that can be used to control one or more different components (not shown), being implemented in FPGA 202 as a single hardware component. First channel 210, second channel 220, and Nth channel 230 (collectively, MLM-based channels) are included in FPGA implementation 200. Each MLM-based channel 210, 220, 230 includes three different MLMs: SVR MLM 170 (i.e., 170a, 170b, 170c), linear regression MLM 180 (i.e., 180a, 180b, 180c), and MLP MLM 100 (i.e., 100a, 100b, 100c), being substantially similar to machine learning channel 100 shown above in regard to FIG. 3. The descriptions of SVR MLM 170, linear regression MLM 180, and MLP MLM 100 are substantially similar to those provided above in regard to FIG. 3. Each MLM in each MLM-based channel utilizes coefficients that are stored in coefficient memory 204. Data bus 206 allows respective MLMs to read its respective coefficients from coefficient memory 204. The outputs of each MLM are directed to multi-layer perceptron machine learning model combination module 140. Each MLM utilizes first and second layer feature creation operations, similar to those described above in regard to FIG. 3. Each MLM-based channel 210, 220, 230 has respective inputs 212, 222, 232 and provides respective output 214, 224, 234.

FPGA implementation 200 is a versatile, configurable, and reusable system that can be implemented as a hardware-based solution in a control system, with each MLM instantiation (i.e., first system 210, second system 220, and Nth system 230) representing one output of a particular embodiment of a control system. FPGA implementation 200 can be referred to as real-time output control that is implemented in hardware. A particular advantage of FPGA implementation 200 of the present disclosure is the ability to be reused, without circuit modification, in another control system. Modifying the data in the coefficient memory 204 provides the capability to uniquely configure the implementation of each MLM-based channel 210, 220, . . . , 230. The following example will describe a particularly embodiment of FPGA implementation 200, but is not to be limiting. FPGA implementation 200 can be performed using a reusable FPGA that accommodates 25 inputs, but the specific implementation requires only 10 inputs. The other 15 unused inputs can be ignored (i.e., bypassed) within FPGA implementation 200 by zeroing out the respective weighting, biasing, and coefficient values. Unused outputs from a particular reusable FPGA can be ignored (i.e., bypassed) in a similar manner. Referring again to the illustrated embodiment, in a particular embodiment it may be determined during a MLM training operation that not all nodes in a particular layer (e.g., input layer 154, first hidden layer 156, second hidden layer 158 of MLP MLM 150 shown in FIG. 4) are required. Accordingly, the unnecessary (i.e., not required) nodes can be bypassed by appropriately setting their respective weighting, biasing, and coefficient values. Moreover, in a particular embodiment, it may be determined during a MLM training operation that one or more layers (e.g., input layer 154, first hidden layer 156, second hidden layer 158 of MLP MLM 150 shown in FIG. 4) are unnecessary (i.e., not required). Accordingly, an entire unnecessary layer can be bypassed by appropriately setting their respective weighting, biasing, and coefficient values. In a similar manner, in a particular embodiment it may be determined during a MLM training operation that not all nodes and/or layers are required for a particular output function. Accordingly, the unnecessary nodes and/or layers can be bypassed by appropriately setting their respective weighting, biasing, and coefficient values.

Referring again to FIG. 6, FPGA implementation 200 can be described as being a hardware implementation of real-time output control. FPGA implementation 200 is an exemplary embodiment showing three or more MLM-based systems being implemented in a hardware component. In some embodiments, fewer than three MLM-based systems can be included in FPGA implementation 200. For example, one MLM-based system in FPGA implementation 200 is within the scope of the present disclosure. In other embodiments, any number of MLM-based systems can be included in FPGA implementation 200, subject to the hardware capability of FPGA 202. It is to be appreciated that in the electrical art, circuit density typically increases year-over-year, thereby accommodating higher-density circuits over time. In the illustrated embodiment, FPGA implementation 200 in implemented in a single FPGA 202. In some embodiments, FPGA 202 can include a number of individual FPGAs. FPGAs are known to those who are skilled in the electrical art, knowing that many different variations are possible. Accordingly, all means of implementing multiple MLM-based systems within a hardware component are within the scope of the present disclosure.

Referring again to FIG. 6, each MLM-based system 210, 220, 230 was depicted as having three different MLMs (i.e, SVR MLM 170, linear regression MLM 180, and MLP MLM 100). These different MLMs are exemplary, and not limiting. Numerous machine learning models that are capable of being implemented in hardware are known to those who are skilled in the machine learning model art, with exemplary MLMs being described above in regard to FIG. 2. Moreover, new hardware-based MLMs are under development. Therefore, all means of implementing hardware-based MLMs in FPGA implementation 200 are within the scope of the present disclosure. In some embodiments, one or more MLM-based systems 210, 220, 230 can include a fourth MLM.

The present disclosure provides several benefits over software-based controllers of the prior art, with non-limiting examples described as follows. Hardware-based MLM implementation removes software vulnerability (e.g., cyber-attack and other maladies). Hardware-based MLM implementations provide a unique implementation option for dissimilar processing elements within a controller for high criticality systems. Hardware-based MLM implementation can provide no-latency processing that can eliminate noise spikes and other transients without adding processing delay. A hardware-based MLM implementation enables a common, unmodified, reuse of the hardware processing element for multiple, dissimilar controller applications. A reusable Hardware-based MLM implementations provide a more cost effective and rapid development time than custom software based development efforts.

Discussion of Possible Embodiments

The following are non-exclusive descriptions of possible embodiments of the present invention.

A machine learning system configured to provide an output based on one or more channel inputs, the machine learning system comprising: one or more machine learning models, each configured to: receive: the one or more channel inputs; and additional feature inputs based on the one or more channel inputs; and produce a machine learning model output; wherein each of the one or more machine learning models is implemented in one or more hardware processors; a first-level feature creation module, configured to: receive the one or more channel inputs; perform a feature creation operation on the one or more channel inputs; create the additional feature inputs; and provide the additional feature inputs to at least one of the one or more machine learning models; wherein: the first-level feature creation operation performs a calculation on one or more aspects of the one or more channel inputs; and a combination module, configured to: receive the one or more machine learning model outputs; and produce a machine learning channel output.

The machine learning system of the preceding paragraph can optionally include, additionally and/or alternatively, any one or more of the following features, configurations and/or additional components:

A further embodiment of the foregoing machine learning system, wherein the feature creation operation comprises one or more of: calculating a slew rate, calculating an average value, calculating a differential input value, performing filtering, and performing a transfer function.

A further embodiment of the foregoing machine learning system, further comprising one or more second-level feature creation module, each configured to: receive at least one of the one or more machine learning model outputs; perform a feature creation operation on the one or more system inputs; create second-level additional feature outputs; and provide the second-level additional feature outputs to the combination module; wherein: the second-level feature creation operation performs a calculation on one or more aspects of at least one of the one or more machine learning model outputs.

A further embodiment of the foregoing machine learning system, wherein the second-level feature creation operation comprises one or more of: calculating a slew rate, calculating an average value, calculating a differential input value, performing filtering, and performing a transfer function.

A further embodiment of the foregoing machine learning system, wherein the combination module is a multi-layer perceptron (MLP) machine learning model.

A further embodiment of the foregoing machine learning system, wherein each of the one or more machine learning models is selected from the group consisting of: multi-layer perceptron (MLP), support vector regression (SVR), and linear regression.

A further embodiment of the foregoing machine learning system, wherein the machine learning system comprises one machine learning model.

A further embodiment of the foregoing machine learning system, wherein a no-latency digital filter comprises the foregoing machine learning system.

A further embodiment of the foregoing machine learning system, wherein the no-latency digital filter is configured to provide zero phase delay.

A further embodiment of the foregoing machine learning system, wherein the one or more hardware processors are a field-programmable gate array (FPGA) or an application specific integrated circuit (ASIC).

A further embodiment of the foregoing machine learning system, wherein: the first-level feature creation module is implemented in the one or more hardware processors; and the one or more second-level feature creation modules are implemented in the one or more hardware processors.

A further embodiment of the foregoing machine learning system, wherein a controller comprises the foregoing machine learning system, and wherein the controller is configured to: receive a command input; receive a condition input; and produce a command output based on the received values of the command input and the condition input.

A method of using a machine learning system to provide an output based on one or more channel inputs, the machine learning channel comprising one or more machine learning models each implemented in one or more hardware processors, a first-level feature creation module, and a combination module, the method comprising: receiving, by a first-level feature creation module, one or more channel inputs; performing, by the first-level feature creation module, a feature creation operation on the one or more channel inputs; wherein the first-level feature creation operation provides a calculation of one or more aspects of the one or more channel inputs; calculating, by the first-level feature creation module, an additional feature outputs; providing, from the first-level feature creation module, the additional feature outputs to at least one of the one or machine learning models; receiving, by each of the one or more machine learning models: the one or more channel inputs; and the additional feature outputs; and receiving, by the combination module, the one or more machine learning model outputs; and producing, by the combination module, a machine learning channel output.

The method of the preceding paragraph can optionally include, additionally and/or alternatively, any one or more of the following features, configurations and/or additional components:

A further embodiment of the foregoing method, wherein the feature creation operation comprises one or more of: calculating a slew rate, calculating an average value, calculating a differential input value, performing filtering, and performing a transfer function.

A further embodiment of the foregoing method, wherein the machine learning system further comprises one or more second-level feature creation module, each configured to: receive at least one of the one or more machine learning model outputs; perform a feature creation operation on the one or more system inputs; create second-level additional feature outputs; and provide the second-level additional feature outputs to the combination module; wherein: the second-level feature creation operation performs a calculation on one or more aspects of at least one of the one or more machine learning model outputs.

A further embodiment of the foregoing method, wherein the second-level feature creation operation comprises one or more of: calculating a slew rate, calculating an average value, calculating a differential input value, performing filtering, and performing a transfer function.

A further embodiment of the foregoing method, wherein the combination module is a multi-layer perceptron (MLP) machine learning model.

A further embodiment of the foregoing method, wherein each of the one or more machine learning models is selected from the group consisting of: multi-layer perceptron (MLP), support vector regression (SVR), and linear regression.

A further embodiment of the foregoing method, wherein the machine learning system comprises one machine learning model.

A further embodiment of the foregoing method, wherein the one or more hardware processors are a field-programmable gate array (FPGA) or an application specific integrated circuit (ASIC).

The invention claimed is:

1. A method of using a machine learning system to provide an output based on one or more channel inputs, the machine learning channel comprising one or more machine learning models each implemented in one or more hardware processors, a first-level feature creation module, a second-level feature creation module, and a combination module, the method comprising:
receiving, by the first-level feature creation module, the one or more channel inputs;
performing, by the first-level feature creation module, a first-level feature creation operation on the one or more channel inputs;
wherein the first-level feature creation operation performs a calculation on one or more aspects of the one or more channel inputs;
calculating, by the first-level feature creation module, one or more first-level additional feature outputs;
providing, from the first-level feature creation module, the one or more first-level additional feature outputs to at least one of one or machine learning models;
receiving, by each of the one or more machine learning models:
the one or more channel inputs; and
the one or more first-level additional feature outputs;
producing, by each of the one or more machine learning models, a machine learning model output;
receiving, by the second-level feature creation module, the machine learning model output from at least one of the one or more machine learning models;
performing, by the second-level feature creation module, a second-level feature creation operation on the machine learning model output from at least one of the one or more machine learning models, wherein the second-level feature creation operation performs a calculation on one or more aspects of at least one of the machine learning model outputs from at least one of the one or more machine learning models;
creating, by the second-level feature creation module, one or more second-level additional feature outputs;
providing, by the second-level feature creation module, the one or more second-level additional feature outputs to the combination module;
receiving, by the combination module, the machine learning model outputs from at least one of the one or more machine learning models and the one or more second-level additional feature outputs; and
producing, by the combination module, a machine learning channel output;
wherein the machine learning system provides zero phase delay; and
wherein the combination module is a multi-layer perceptron (MLP) machine learning model.

2. The method of claim 1, wherein the first-level feature creation operation comprises one or more of: calculating a slew rate, calculating an average value, calculating a differential input value, performing filtering, and performing a transfer function.

3. The method of claim 1, wherein the second-level feature creation operation comprises one or more of: calculating a slew rate, calculating an average value, calculating a differential input value, performing filtering, and performing a transfer function.

4. The method of claim 1, wherein each of the one or more machine learning models is selected from the group consisting of: multi-layer perceptron (MLP), support vector regression (SVR), and linear regression.

5. The method of claim 1, wherein the one or more machine learning models comprises only one machine learning model.

6. The method of claim 1, wherein the one or more hardware processors are a field-programmable gate array (FPGA) or an application specific integrated circuit (ASIC).

7. A controller, comprising:
a machine learning system configured to provide an output based on one or more channel inputs, the machine learning system comprising:
one or more first-level feature creation modules, configured to:
receive the one or more channel inputs;
perform a first-level feature creation operation on the one or more channel inputs; and
create additional feature inputs;
wherein:
the first-level feature creation operation performs a calculation on one or more aspects of the one or more channel inputs;

one or more machine learning models, each configured to:
  receive:
    the one or more channel inputs; and
    the additional feature inputs from the one or more first-level feature creation modules; and
  produce a machine learning model output;
  wherein each of the one or more machine learning models is implemented in one or more hardware processors;
one or more second-level feature creation modules, each configured to:
  receive the machine learning model output from at least one of the one or more machine learning models;
  perform a second-level feature creation operation on the machine learning model output from at least one of the one or more machine learning models; and
  create second-level additional feature outputs;
  wherein:
    the second-level feature creation operation performs a calculation on one or more aspects of the machine learning model output from at least one of the one or more machine learning models; and
a combination module, configured to:
  receive the machine learning model output from at least one of the one or more machine learning models;
  receive the second-level additional feature outputs from the one or more second-level feature creation modules; and
  produce a machine learning channel output;
wherein the machine learning system is configured to provide zero phase delay, wherein the controller is configured to:
  receive a command input;
  receive a condition input; and
  produce a command output based on the received values of the command input and the condition input.

8. The machine learning system of claim 7, wherein the first-level feature creation operation comprises one or more of: calculating a slew rate, calculating an average value, calculating a differential input value, performing filtering, and performing a transfer function.

9. The machine learning system of claim 7, wherein the second-level feature creation operation comprises one or more of: calculating a slew rate, calculating an average value, calculating a differential input value, performing filtering, and performing a transfer function.

10. The machine learning system of claim 7, wherein:
  the one or more first-level feature creation modules are implemented in the one or more hardware processors; and
  the one or more second-level feature creation modules are implemented in the one or more hardware processors.

11. The machine learning system of claim 7, wherein the combination module is a multi-layer perceptron (MLP) machine learning model.

12. The machine learning system of claim 7, wherein each of the one or more machine learning models is selected from the group consisting of: multi-layer perceptron (MLP), support vector regression (SVR), and linear regression.

13. The machine learning system of claim 7, wherein the one or more machine learning models comprises a single machine learning model.

14. The machine learning system of claim 7, wherein the one or more hardware processors are a field-programmable gate array (FPGA) or an application specific integrated circuit (ASIC).

15. A no-latency digital filter, comprising the controller of claim 7.

\* \* \* \* \*